UNITED STATES PATENT OFFICE.

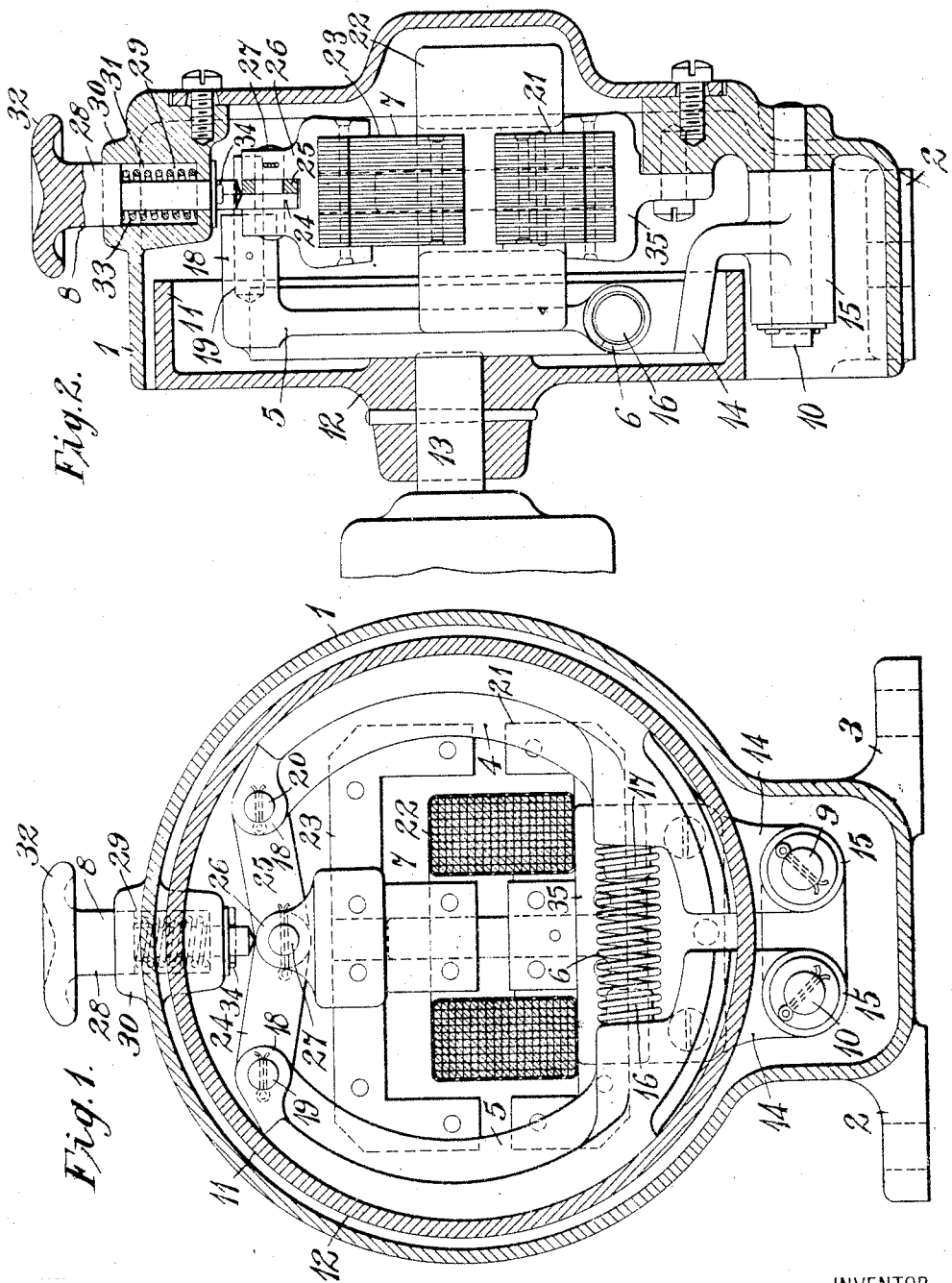

CHRISTIAN AALBORG, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

WHEEL-BRAKE.

1,024,489.    Specification of Letters Patent.    Patented Apr. 30, 1912.

Application filed April 10, 1908. Serial No. 426,314.

*To all whom it may concern:*

Be it known that I, CHRISTIAN AALBORG, a citizen of the United States, and a resident of Wilkinsburg, in the county of Allegheny and State of Pennsylvania, have invented a new and useful Improvement in Wheel-Brakes, of which the following is a specification.

My invention relates to electrically released wheel brakes, and it has for its object to provide a device of this character that shall be especially simple and compact in construction and that shall embody a manually operated attachment for temporarily effecting the results normally secured by the electro-responsive means.

My improved braking device is specially adapted for use with electric motors, since its releasing magnet may be supplied with energy from either alternating or direct current sources without injury, and by reason of the relatively small space which the assembled device occupies.

Figure 1 of the accompanying drawings is an end elevation of a device constructed in accordance with my invention, the rotatable pulley with which it is associated being shown in section to disclose the operating parts of the brake, and Fig. 2 is a sectional view of the device shown in Fig. 1, a portion of a shaft and axle bearing being shown for the purpose of illustrating the application of the brake to the usual form of motor shaft.

Referring to the drawings, the device illustrated comprises an inclosing casing 1 which forms a supporting frame for the other parts and is provided with base projections 2 and 3, braking contact shoes 4 and 5, an actuating spring 6, a release magnet 7 and a manually-operated releasing device 8. The shoes 4 and 5 are provided with cylindrically curved outer surfaces and are movably mounted on stationary pin shafts 9 and 10 which are parallel to each other and project inwardly from the supporting frame 1, near the base projections 2 and 3. The outer surfaces of the shoes are adapted to engage the inner cylindrical surface of a flange or annular projection 11 of a sheave or pulley 12 which is keyed to a rotatable shaft 13, and, in order to avoid interference between the outer edge of the flange and the shoes, the supporting arms 14 for the latter are offset and extend under the flange of the pulley from bearing sleeves 15 which are mounted on the shafts 9 and 10. The shoes are also provided with spring-supporting projections 16 and 17 that are opposite each other and extend for short distances into the ends of the spring 6 which tends to force the brake shoes into engagement with the pulley flange. The outer ends of the shoes are provided with lateral projections 18 to which pin shafts 19 and 20 are secured.

The operating magnet 7 comprises a double U-shaped stationary core member 21, an actuating coil 22 mounted on the intermediate projections of the stationary core, and a movable member 23 which is similar to the stationary core member 21 and is connected to the extremities of the shoes by means of links 24 and 25 the outer ends of which are mounted on the pin shafts 19 and 20 and the inner ends of which are pivotally connected together and to a bifurcated projection 26 on the movable core member, by means of a pin shaft 27.

The arrangement of parts is such that when the electro-magnet is deënergized and the manually operated device 8 released, the spring 6 forces the shoes into engagement with the pulley flange and the stationary and movable core members are materially separated from each other. When the electro-magnet winding 22 is energized, the movable core member 23 is attached to the stationary member 21 and the shoes 4 and 5 are separated from the surface of the pulley by the toggle action of the links 24 and 25.

When it is desired to release the brake without energizing the electro-magnet winding 22, the device 8 may be employed, which comprises a push-pin 28 that extends through a hole 29 in a boss 30 provided at the top of the casing 1 and rests upon the links 24 and 25 at their point of connection. The hole 29 is counter-bored to form a recess 31 and the outer extremity of the push pin 28 is provided with a head or enlargement 32 which fits into the recess. A spring 33 encircles the push pin between the enlargement 32 and the bottom of the recess and the outward movement of the pin is limited by a cotter pin 34, the arrangement of parts being such that the inner end of the push pin will not interfere with the operation of the brake unless the spring 33 is compressed by the manual actuation of the push pin. The stationary core member 21 of the electro-magnet is mounted on a supporting bracket 35 which is bolted to a portion of the bottom casting of the casing and the weight of the movable core member is sustained by, and acts in opposition to, the spring 6.

It will be understood that the electro-magnet is adapted for operation when either direct or alternating current energy is supplied to its winding.

Various structural modifications may be effected in the device illustrated without departing from the spirit and scope of my invention, and I desire that only such limitations shall be imposed as are indicated in the appended claims.

I claim as my invention:

1. A symmetrical wheel brake comprising a flanged pulley or sheave, a pair of contact shoes having cylindrically curved outer surfaces lying in concentric arcs within the pulley flange, said shoes being pivotally mounted at one end in a single plane, a pair of links joining the free ends of the shoes, an interposed spring acting directly upon the shoes and tending to force them into engagement with the pulley flange, and an electro-magnet and a manually operated thrust rod which are severally adapted to break the toggle joint formed by the two links.

2. The combination with a rotatable pulley or sheave having an annular flange, a pair of symmetrically disposed brake shoes pivotally supported outside of the annular flange and having cylindrically curved outer surfaces which are adapted to make frictional engagement with the inner surface of said flange, an interposed compression spring acting directly on the shoes adjacent to their pivots and tending to separate them, a pair of links connecting the shoes at one end, an electro-magnet centrally disposed relative to the pulley flange and comprising a stationary core member, a magnet winding and a movable core member, said movable member being secured to the point of connection between the two links, and a manually-operated thrust rod for breaking the toggle joint formed by the two links.

In testimony whereof, I have hereunto subscribed my name this 27th day of March, 1908.

CHRISTIAN AALBORG.

Witnesses:
C. F. DOTTS,
BIRNEY HINES.